US012598378B2

(12) United States Patent
Kim et al.

(10) Patent No.: US 12,598,378 B2
(45) Date of Patent: Apr. 7, 2026

(54) IMAGE OBTAINING METHOD, APPARATUS, AND COMPUTER PROGRAM

(71) Applicant: Hanwha Vision Co., Ltd., Seongnam-si (KR)

(72) Inventors: Dae Bong Kim, Seongnam-si (KR); Jung Kyung Lee, Seongnam-si (KR); Dong Jin Park, Seongnam-si (KR); Young Sang Kwon, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 242 days.

(21) Appl. No.: 18/039,169

(22) PCT Filed: Jan. 4, 2022

(86) PCT No.: PCT/KR2022/000072
§ 371 (c)(1),
(2) Date: May 26, 2023

(87) PCT Pub. No.: WO2022/164066
PCT Pub. Date: Aug. 4, 2022

(65) Prior Publication Data
US 2024/0007745 A1      Jan. 4, 2024

(30) Foreign Application Priority Data
Jan. 26, 2021     (KR) ........................ 10-2021-0011045

(51) Int. Cl.
*H04N 23/667* (2023.01)
*H04N 23/67* (2023.01)
*H04N 23/71* (2023.01)

(52) U.S. Cl.
CPC ........... *H04N 23/667* (2023.01); *H04N 23/67* (2023.01); *H04N 23/71* (2023.01)

(58) Field of Classification Search
CPC ....... H04N 23/667; H04N 23/67; H04N 23/71
(Continued)

(56) References Cited

U.S. PATENT DOCUMENTS

| | | | | |
|---|---|---|---|---|
| 2011/0122252 A1* | 5/2011 | Choi | ...................... | G03B 11/00 348/E5.09 |
| 2016/0353017 A1 | 12/2016 | Kim et al. | | |

FOREIGN PATENT DOCUMENTS

| | | | |
|---|---|---|---|
| JP | 3738795 B2 | 1/2006 | |
| KR | 10-2011-0056096 A | 5/2011 | |

(Continued)

OTHER PUBLICATIONS

International Search Report (PCT/ISA/210) issued Mar. 30, 2022 by the International Searching Authority in counterpart International Patent Application No. PCT/KR2022/000072.

(Continued)

*Primary Examiner* — Joel W Fosselman
(74) *Attorney, Agent, or Firm* — Sughrue Mion, PLLC

(57) ABSTRACT

An image obtaining method employed by an image obtaining apparatus including a filter for reducing light of a first wavelength for focus control according to an embodiment of the inventive concept includes selecting a filter corresponding to a brightness of a photographing area from among one or more filters, wherein the one or more filters include a second filter that reduces light of the first wavelength; adjusting a focus based on light obtained from the photographing area to which the light of the first wavelength is irradiated; and obtaining an image using light obtained from the photographing area through a filter corresponding to the brightness.

21 Claims, 4 Drawing Sheets

(58) Field of Classification Search
  USPC .......................................................... 348/345
  See application file for complete search history.

(56)                          References Cited

FOREIGN PATENT DOCUMENTS

| KR | 10-1036172 | B1 | 5/2011 |
|----|------------|----|--------|
| KR | 10-2015-0041535 | A | 4/2015 |
| KR | 10-2016-0058607 | A | 5/2016 |
| KR | 10-2016-0059815 | A | 5/2016 |
| KR | 10-1767934 | B1 | 8/2017 |
| KR | 10-2064086 | B1 | 1/2020 |

OTHER PUBLICATIONS

Written Opinion (PCT/ISA/237) issued Mar. 30, 2022 by the International Searching Authority in counterpart International Patent Application No. PCT/KR2022/000072.

* cited by examiner

IMAGE OBTAINING METHOD, APPARATUS, AND COMPUTER PROGRAM

CROSS-REFERENCE TO RELATED APPLICATIONS

This application is a National Phase Entry of PCT International Application No. PCT/KR2022/000072, filed on Jan. 4, 2022, which claims priority to Korean Patent Application No. 10-2021-0011045 filed on Jan. 26, 2021, the contents of all of which are incorporated herein by reference in their entirety.

TECHNICAL FIELD

The inventive concept relates to an image acquisition method, an apparatus including a filter for reducing light of a first wavelength for focusing, and a computer program Since the light used for focus adjustment causes discomfort to a user when observed with the naked eye, light having a wavelength outside the wavelength range of visible light is generally used.

However, the light for focusing is not observed by the human eye, but the light for focusing has a wavelength within the wavelength range of light that may be accommodated by an image sensor, such as an image acquisition device, thereby affecting the acquired image.

In particular, in a low-illumination environment where the use of a generally used infrared filter is excluded, the effect of the light for adjusting the focus on the image further increases, and thus, the image acquisition device cannot acquire the intended image.

DISCLOSURE

Technical Problem

The inventive concept is to solve the above-mentioned problems and to minimize the effect of light for focusing on an image.

Technical Solution

An image obtaining method employed by an image obtaining apparatus including a filter for reducing light of a first wavelength for focus control according to an embodiment of the inventive concept may include: selecting a filter corresponding to a brightness of a photographing area from among one or more filters, wherein the one or more filters include a second filter that reduces light of the first wavelength; adjusting focus based on light obtained from the photographing area to which the light of the first wavelength is irradiated; and obtaining an image using light obtained from the photographing area through a filter corresponding to the brightness.

The image obtaining method according to an embodiment of the inventive concept may further include, before the selecting of the filter, checking the brightness of the photographing area based on at least one of an image obtained by an image sensor and a brightness monitored by a brightness sensor.

The selecting of the filter may include: selecting a first filter that reduces light of a second wavelength or higher as a filter corresponding to the brightness when the brightness of the photographing area is greater than or equal to a predetermined first threshold brightness; selecting the second filter as a filter corresponding to the brightness when the brightness of the photographing area is less than the first threshold brightness and greater than or equal to a second threshold brightness; and selecting a third filter that passes light of all wavelengths as a filter corresponding to the brightness when the brightness of the photographing area is less than the second threshold brightness. In this case, a wavelength range of the second wavelength or more may include the first wavelength.

The adjusting of the focus may include: radiating light of the first wavelength to the photographing area according to a first mode when one of the first filter and the second filter is selected as the filter corresponding to the brightness in the selecting of the filter; and irradiating the light of the first wavelength to the photographing area according to a second mode when the third filter is selected as the filter corresponding to the brightness in the selecting of the filter.

The first mode may be a mode in which the light of the first wavelength is continuously irradiated to the photographing area, and the second mode may be a mode in which irradiation of light of the first wavelength is stopped to the photographing area in at least a partial time period.

The second mode may be a mode that irradiates the light of the first wavelength only in a time period in which the image obtaining apparatus adjusts the focus for the photographing area and stops the irradiation of the light of the first wavelength in a time period in which an image of the photographing area is acquired using an image sensor.

An image obtaining apparatus including a filter for reducing light of a first wavelength for focus control according to an embodiment of the inventive concept may include a light source configured to radiate light of a first wavelength to a photographing area; an image sensor configured to convert light incident from the photographing area into an electrical signal; a filter group including at least one filter disposed between the incident light and the image sensor; and a processor configured to select one of one or more filters included in the filter group as a filter according to a brightness of the photographing area, adjust a focus based on light obtained by irradiation of light of the first wavelength onto the photographing area, and obtain an image using light obtained through the selected filter.

The image obtaining apparatus may further include a brightness sensor for detecting brightness of the photographing area, wherein the processor may check the brightness of the photographing area based on at least one of an image obtained by the image sensor and a brightness monitored by the brightness sensor.

The processor may select a first filter that reduces light of a second wavelength or more as a filter corresponding to the brightness when the brightness of the photographing area is greater than or equal to a predetermined first threshold brightness, select the second filter as a filter corresponding to the brightness when the brightness of the photographing area is less than the first threshold brightness and greater than or equal to a second threshold brightness, and select a third filter that passes light of all wavelengths as a filter corresponding to the brightness when the brightness of the photographing area is less than the second threshold brightness, wherein a wavelength range of the second wavelength or more may include the first wavelength.

The processor may control the light source to radiate light of the first wavelength to the photographing area according to a first mode when one of the first filter and the second filter is selected as the filter corresponding to the brightness, and control the light source to radiate light of the first wavelength to the photographing area according to a second mode when the third filter is selected as the filter corresponding to the brightness in the selecting of the filter.

The first mode may be a mode in which light of the first wavelength is continuously irradiated to the photographing area, and the second mode may be a mode in which irradiation of light of the first wavelength is stopped to the photographing area in at least a partial time period.

The second mode may be a mode wherein the light of the first wavelength is irradiated only in a time period in which the image obtaining apparatus adjusts the focus for the photographing area and the irradiation of the light of the first wavelength is stopped in a time period in which an image of the photographing area is acquired using an image sensor.

Other aspects, features and advantages other than those described above will become apparent from the following drawings, claims and detailed description of the invention.

Advantageous Effects

According to the inventive concept, it is possible to minimize the effect of light for focusing on an image.

In addition, according to the inventive concept, it is possible to minimize the effect of light for focusing on an image even in a low-light environment, and to accurately adjust the focus and obtain a clear image.

BEST MODE

Figure 1:
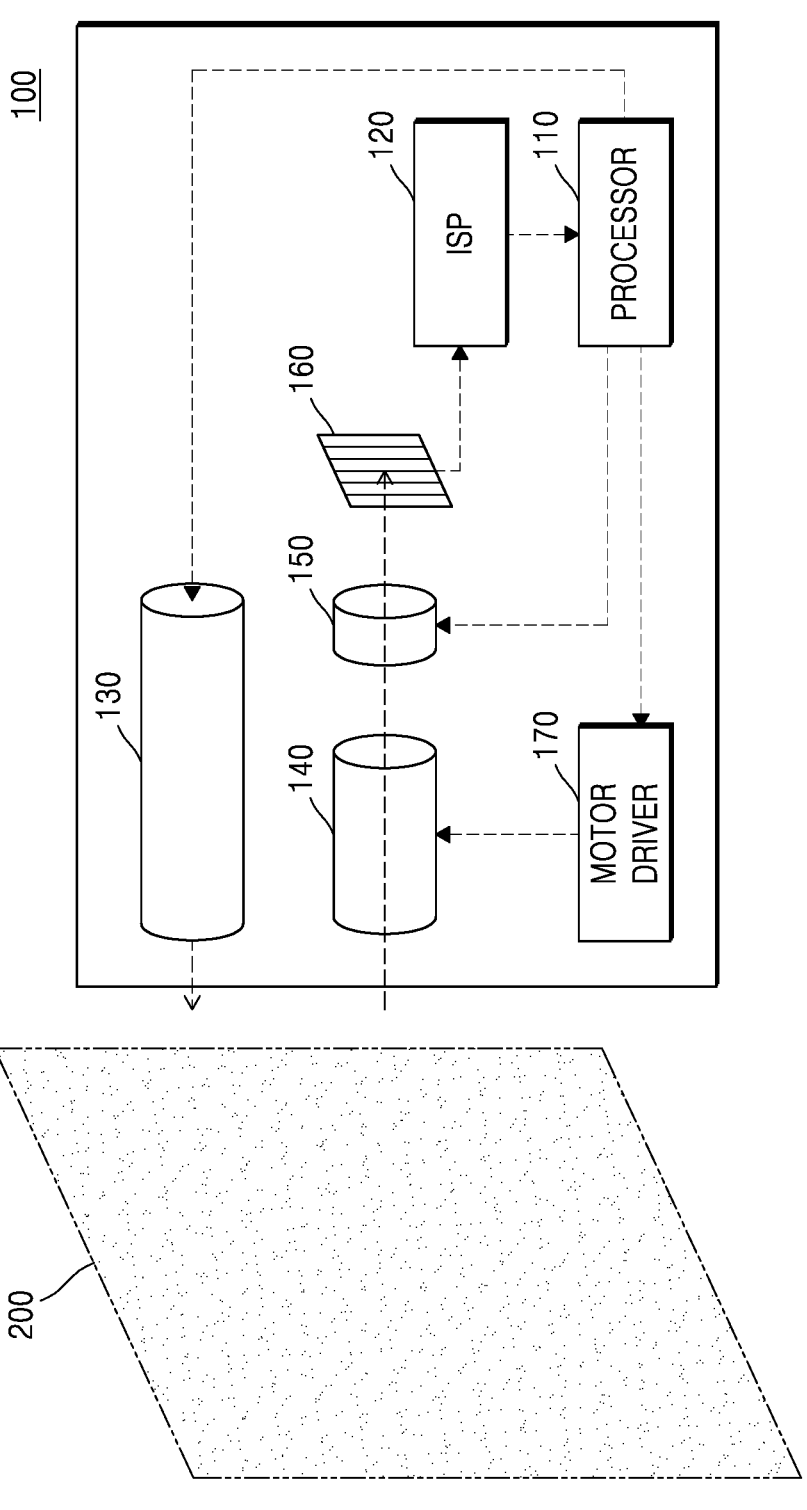
FIG. 1 is a diagram schematically showing the configuration of an image obtaining apparatus 100 according to an embodiment of the inventive concept.

An image obtaining method of an image obtaining apparatus including a filter for reducing light of a first wavelength for focus control according to an embodiment of the inventive concept may include: selecting a filter corresponding to a brightness of a photographing area from among one or more filters, wherein the one or more filters include a second filter that reduces light of the first wavelength; adjusting a focus based on light obtained from the photographing area to which the light of the first wavelength is irradiated; and obtaining an image using light obtained from the photographing area through a filter corresponding to the brightness.

MODE FOR INVENTION

Since the inventive concept may apply various modifications and have various embodiments, specific embodiments are illustrated with reference to the drawings and will be described in detail. Effects and features of the inventive concept, and a method of achieving them will be apparent with reference to the embodiments described below in detail together with the drawings. However, the inventive concept is not limited to the embodiments disclosed below and may be implemented in various forms.

Hereinafter, embodiments of the inventive concept will be described in detail with reference to the accompanying drawings, and when describing with reference to the drawings, the same or corresponding constituent elements are given the same reference numerals, and redundant descriptions thereof will be omitted.

In the following embodiments, terms, such as first and second are not used in a limiting meaning, but for the purpose of distinguishing one component from another component. In the following examples, the singular expression includes the plural expression unless the context clearly indicates otherwise. In the following embodiments, terms, such as include or have means that the features or elements described in the specification are present, and do not preclude the possibility of adding one or more other features or elements in advance. In the drawings, components may be exaggerated or reduced in size for convenience of description. For example, the size and shape of each component shown in the drawings are arbitrarily shown for convenience of description, and thus the inventive concept is not necessarily limited to what is shown.

FIG. 1 is a diagram schematically showing the configuration of an image obtaining apparatus 100 according to an embodiment of the inventive concept.

The image obtaining apparatus 100 according to an embodiment of the inventive concept includes a filter for reducing light of a first wavelength for focus control in the obtained light, and may minimize the effect of light for focusing on the image by using a corresponding filter when the brightness of the photographing area 200 satisfies a predetermined condition.

As shown in FIG. 1, the image obtaining apparatus 100 according to an embodiment of the inventive concept may include a processor 110, an ISP 120, a light source 130, a lens group 140, a filter group 150, an image sensor 160, and a motor driver 170.

The processor 110 according to an embodiment of the inventive concept may control the filter group 150 disposed between the lens group 140 and the image sensor 160 based on the brightness of the photographing area 200. For example, when the brightness of the photographing area 200 is less than the first threshold brightness and greater than the second threshold brightness, the processor 110 may arrange a filter for reducing light of a first wavelength, which is a wavelength of light irradiated by the light source 130, to be disposed between the lens group 140 and the image sensor 160. However, this is merely an example and the spirit of the inventive concept is not limited thereto.

Meanwhile, in the inventive concept, the 'processor' may refer to a data processing device embedded in hardware having a circuit physically structured to perform a function represented by a code or instruction included in a program. As an example of a data processing device embedded in the hardware as described above, processing devices may include a microprocessor, a Central Processing Unit (CPU), a processor core, a multiprocessor, an Application-Specific Integrated Circuit (ASIC), a Field Programmable Gate Array (FPGA), and the like, but the scope of the inventive concept is not limited thereto.

Such a processor 110 may be composed of a single processor or may be composed of a plurality of processors divided into units of functions performed by the processor 110.

The ISP 120 and the image sensor 160 according to an embodiment of the inventive concept may convert light (or optical signals) into electrical signals. For example, the image sensor 160 is composed of a Charge Coupled Device

5

(CCD) or a Complementary Metal-Oxide-Semiconductor (CMOS), and may convert light passing through the lens group 140 and/or filter group 150 into an electrical signal. In addition, the ISP 120 may process an image obtained by the image sensor 160 (or an unprocessed RAW image) in a predetermined manner. For example, the ISP 120 may compress the image obtained by the image sensor 160 in a predetermined method.

In one embodiment of the inventive concept, the ISP 120 and the image sensor 160 may be configured independently as shown in FIG. 1 or integrated into one component.

The lens group 140 and the motor driver 170 according to an embodiment of the inventive concept may perform operations for adjusting various parameters related to the image obtaining apparatus 100 under the control of the processor 110.

For example, the lens group 140 and/or the motor driver 170 according to an embodiment of the inventive concept may adjust the position of at least one lens to adjust the focus according to the control of the processor 110. At this time, the lens group 140 may include at least one lens (or a single lens).

In addition, the lens group 140 and/or the motor driver 170 according to an embodiment of the inventive concept may adjust the aperture opening degree under the control of the processor 110.

Also, the lens group 140 and/or the motor driver 170 according to an embodiment of the inventive concept may adjust the zoom according to the control of the processor 110. However, the above-described parameters are exemplary and the spirit of the inventive concept is not limited thereto.

The filter group 150 according to an embodiment of the inventive concept is disposed between the above-described lens group 140 and the image sensor 160 to adjust the wavelength configuration of incident light.

In one embodiment of the inventive concept, the filter group 150 includes one or more filters, and the selected filter may be positioned between the lens group 140 and the image sensor 160 under the control of the processor 110. For example, the filter group 150 includes a first filter that reduces light of a second wavelength or higher, a second filter that reduces light of the first wavelength, and a third filter that passes light of all wavelengths, and under the control of the processor 110, any one of the three filters described above may be positioned between the lens group 140 and the image sensor 160. In this case, the first wavelength may be a wavelength greater than the second wavelength.

The light source 130 according to an embodiment of the inventive concept may emit light of a first wavelength for adjusting the focus of the image obtaining apparatus 100 on the photographing area 200. In this case, the first wavelength may correspond to any one of 650 nm, 905 nm, and 1550 nm, for example. However, this is merely an example and the spirit of the inventive concept is not limited thereto.

In the light source 130 according to an embodiment of the inventive concept, a mode of irradiating light may be changed according to a filter used in the filter group 150 described above. For example, when any one of the first filter and the second filter described above is selected by the processor 110, the light source 130 may radiate light of a first wavelength to the photographing area 200 according to a first mode. In this case, the first mode may be a mode in which light of the first wavelength is continuously irradiated to the photographing area 200.

Meanwhile, when the third filter is selected by the processor 110, the light source 130 may radiate light of the first wavelength to the photographing area 200 according to the second mode. In this case, the second mode may be a mode in which irradiation of light of the first wavelength to the photographing area 200 is stopped during at least a partial time period during image acquisition. However, this is merely an example and the spirit of the inventive concept is not limited thereto.

Hereinafter, the image obtaining apparatus 100 according to an embodiment of the inventive concept will be described, focusing on the operation of the processor 110.

The processor 110 according to an embodiment of the inventive concept may check the brightness of the photographing area 200. For example, the processor 110 may check the brightness of the photographing area 200 based on an image obtained by the image sensor 160 in real time.

In an optional embodiment of the inventive concept, the processor 110 may check the brightness of the photographing area 200 using a separate brightness sensor (not shown) provided in the image obtaining apparatus 100.

In the inventive concept, 'photographing area' may refer to an area to be image obtained. For example, the photographing area may mean a space including an object to be image obtained.

The processor 110 according to an embodiment of the inventive concept may select a filter corresponding to the brightness of the photographing area 200 from the filter group 150.

Figure 2:
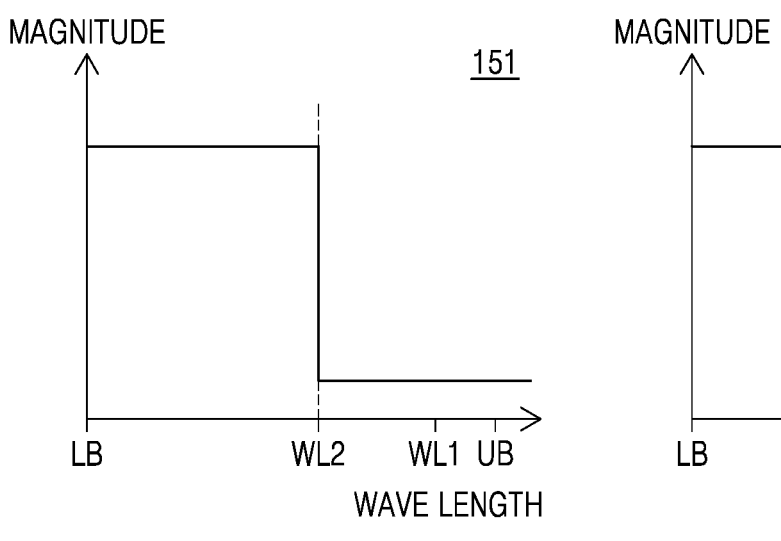
FIG. 2 is an example illustrating characteristics of filters 151, 152, 153, and 154 included in a filter group 150.
Figure 2:
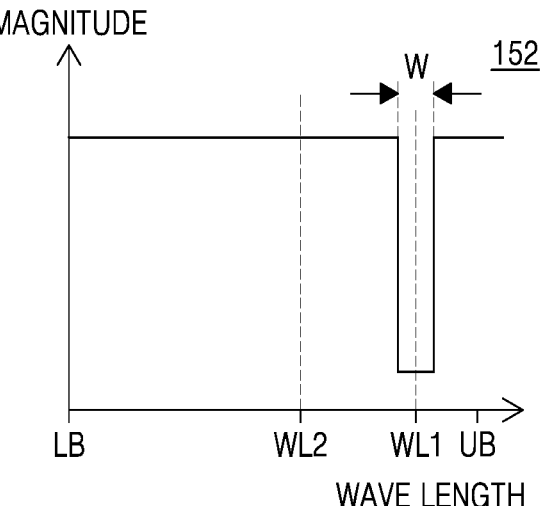
Figure 2:
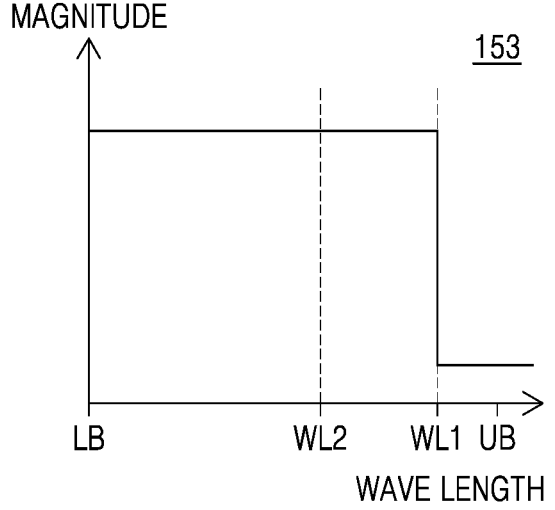
Figure 2:
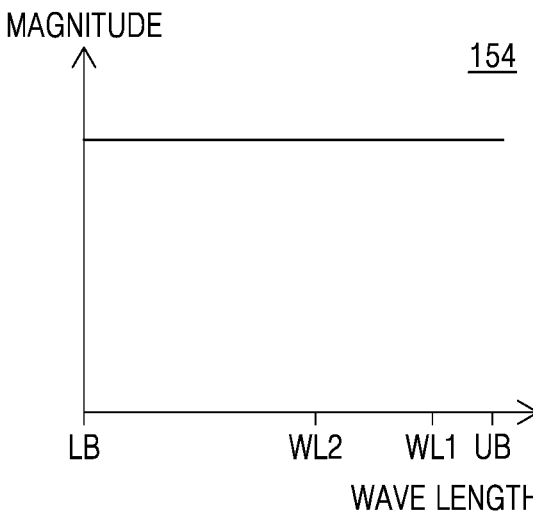

FIG. 2 is an example illustrating characteristics of filters 151, 152, 153, and 154 included in the filter group 150.

In FIG. 2, 'LB' may mean the lowest wavelength used in image acquisition. For example, LB may correspond to 400 nm. Also, 'UB' may mean the highest wavelength used in image acquisition. For example, UB may correspond to 1100 nm. However, these numerical values are exemplary, and may correspond to LB and UB of the present application if they are numerical values for indicating a wavelength range corresponding to visible light in fact.

Also, the first wavelength WL1 may be greater than the second wavelength WL2. In other words, a wavelength range equal to or greater than the second wavelength WL2 may include the first wavelength WL1.

The filter group 150 according to an embodiment of the inventive concept may include a first filter 151 that reduces light of the second wavelength WL2 or higher. In this case, the second wavelength WL2 may correspond to, for example, 650 nm. Such a first filter 151 may be used to remove infrared components from incident light.

Also, the filter group 150 according to an embodiment of the inventive concept may include second filters 152 and 153 that reduce light of the first wavelength WL1. In this case, the first wavelength WL1 is a wavelength of light emitted from the light source 130 for focus control as described above, and may correspond to, for example, 905 nm. Such second filters 152 and 153 may be used to remove components of light for focus control from incident light.

Meanwhile, in one embodiment of the inventive concept, the second filter 152 may be configured to remove wavelengths corresponding to a predetermined width W around the first wavelength WL1.

Also, in another embodiment of the inventive concept, the second filter 153 may be configured to remove wavelengths greater than or equal to the first wavelength WL1.

As such, 'removing the light of the first wavelength WL1' in the inventive concept may mean removing a range of wavelengths including light of the corresponding wavelength (e.g., as in the second filter 153) in addition to removing only the corresponding wavelength (e.g., as in the second filter 152).

The filter group 150 according to an embodiment of the inventive concept may include a third filter 154 passing light of all wavelengths. Such a third filter 154 may be used to obtain a brightest image as much as possible in an extremely low light environment.

When the brightness of the photographing area 200 is greater than or equal to a predetermined first threshold brightness, the processor 110 according to an embodiment of the inventive concept may select a first filter among the above-described filters as a filter corresponding to the brightness. In this case, the first threshold brightness may be greater than the second threshold brightness.

Also, when the brightness of the photographing area 200 is less than the first threshold brightness and greater than or equal to the second threshold brightness, the processor 110 may select the second filter as a filter corresponding to the brightness.

Also, when the brightness of the photographing area 200 is less than the second threshold brightness, the processor 110 may select a third filter as a filter corresponding to the brightness.

The processor 110 according to an embodiment of the inventive concept may adjust the focus based on light obtained from the photographing area 200 to which the light of the first wavelength WL1 is irradiated.

At this time, the processor 110 according to an embodiment of the inventive concept may determine a mode for irradiating light of the first wavelength WL1 according to the type of filter (or the brightness of the photographing area 200) determined according to the above-described process.

Figure 3:
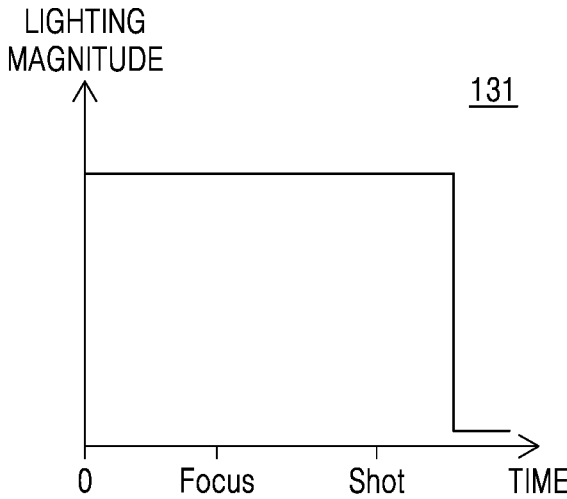
FIG. 3 is a diagram for explaining a first mode 131 and a second mode 132 according to an embodiment of the inventive concept.
Figure 3:
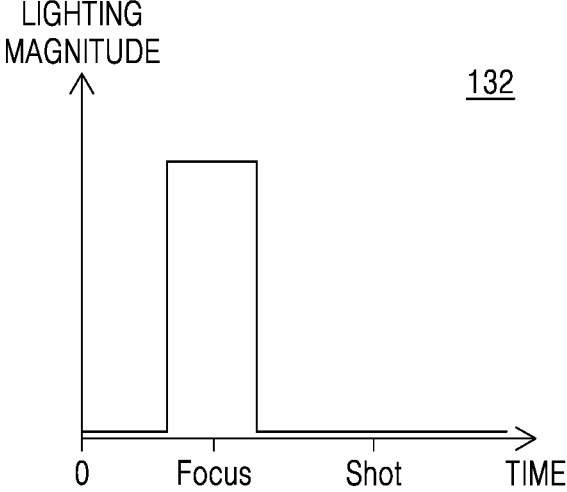

FIG. 3 is a diagram for explaining a first mode 131 and a second mode 132 according to an embodiment of the inventive concept.

For example, when one of the first filter and the second filter is selected according to the above process (or when the brightness of the photographing area 200 is greater than or equal to the first threshold brightness, or when the brightness of the photographing area 200 is the first threshold brightness less than and greater than the second threshold brightness), the processor 110 may radiate light of the first wavelength WL1 to the photographing area 200 according to the first mode 131. In this case, the first mode 131 may be a mode in which light of the first wavelength is continuously irradiated to the photographing area 200 during the image acquisition process.

Meanwhile, when the third filter is selected according to the above process (or when the brightness of the photographing area 200 is less than the second threshold brightness), the processor 110 may radiate light of the first wavelength WL1 to the photographing area 200 according to the second mode 132. In this case, the second mode 132 may be a mode in which irradiation of light of the first wavelength WL1 to the photographing area 200 is stopped during at least a partial time period during image acquisition.

As described above, since the third filter corresponds to a filter that passes light of all wavelengths, the third filter may be a filter suitable for obtaining an image in an extremely low illumination environment. However, because light for focus control also passes due to the characteristics of the third filter, an image obtained by the image sensor 160 may be affected by light for focus control. Accordingly, the processor 110 may restrictly exclude the effect of light for focus control on an image obtained using light of the first wavelength WL1 only in the focus control step, for example.

The processor 110 according to an embodiment of the inventive concept may adjust the focus using various known methods under the above-described light source control method. For example, the processor 110 may adjust the focus using the contrast of the image, or may adjust the focus using the edge component of the image. However, this is merely an example and the spirit of the inventive concept is not limited thereto.

The processor 110 according to an embodiment of the inventive concept may obtain an image using light obtained from the photographing area 200 through a filter selected according to the above-described process. For example, when the first filter is selected according to the above-described process (that is, when the brightness of the photographing area 200 is greater than or equal to a predetermined first threshold brightness or when the amount of light is sufficient), the processor 110 may continuously radiate light of the first wavelength WL1 to the photographing area 200. In this case, the processor 110 may adjust the focus using light obtained from the photographing area 200 to which light of the first wavelength WL1 is irradiated (or light incident from the photographing area 200). Also, the processor 110 may obtain an image using light obtained through the first filter. In other words, the processor 110 may obtain an image using light from which wavelengths equal to or greater than the second wavelength WL2 are removed (of course, light from which the light of the first wavelength WL1 is also removed).

On the other hand, when the second filter is selected according to the above-described process (i.e., when the brightness of the photographing area 200 is less than a predetermined first threshold brightness and greater than a predetermined second threshold brightness or when the amount of light is insufficient), the processor 110 may continuously radiate light of the first wavelength WL1 to the photographing area 200. In this case, the processor 110 may adjust the focus using light obtained from the photographing area 200 to which light of the first wavelength WL1 is irradiated (or light incident from the photographing area 200). Also, the processor 110 may obtain an image using light obtained through the second filter. In other words, the processor 110 may obtain an image using light having a reduced first wavelength WL1 (or light having a reduced wavelength equal to or greater than the first wavelength WL1).

Meanwhile, when the third filter is selected according to the above process (i.e., when the brightness of the photographing area 200 is less than the predetermined second threshold brightness or when the amount of light is extremely insufficient), the processor 110 may radiate light of the first wavelength WL1 to the photographing area 200 only during a partial time period (e.g., a focus adjustment period). In this case, the processor 110 may adjust the focus using light obtained from the photographing area 200 to which light of the first wavelength WL1 is irradiated (or light incident from the photographing area 200). Also, the processor 110 may obtain an image using light obtained through the third filter. In other words, the processor 110 may obtain an image using light including all wavelengths.

Accordingly, the inventive concept may improve focus control performance in various brightness environments.

Figure 4:
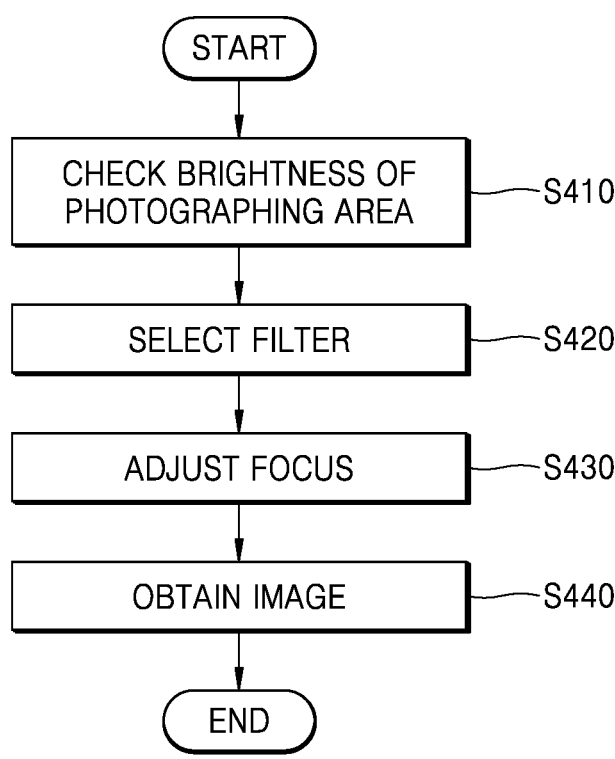
FIG. 4 is a flowchart for explaining an image obtaining method performed by a processor 110 according to an embodiment of the inventive concept.

FIG. 4 is a flowchart for explaining an image obtaining method performed by the processor 110 according to an embodiment of the inventive concept. Hereinafter, it will be described with reference to FIGS. 1 to 3 together.

The processor 110 according to an embodiment of the inventive concept may check the brightness of the photographing area 200 in S410. For example, the processor 110 may check the brightness of the photographing area 200 based on an image obtained by the image sensor 160 in real time.

In an optional embodiment of the inventive concept, the processor 110 may check the brightness of the photographing area 200 using a separate brightness sensor (not shown) provided in the image obtaining apparatus 100.

In the inventive concept, 'photographing area' may refer to an area to be image obtained. For example, the photographing area may mean a space including an object to be image obtained.

The processor 110 according to an embodiment of the inventive concept may select a filter corresponding to the brightness of the photographing area 200 from the filter group 150 in S420.

FIG. 2 is an example illustrating characteristics of filters 151, 152, 153, and 154 included in the filter group 150.

In FIG. 2, 'LB' may mean the lowest wavelength used in image acquisition. For example, LB may correspond to 400 nm. Also, 'UB' may mean the highest wavelength used in image acquisition. For example, UB may correspond to 1100 nm. However, these numerical values are exemplary, and may correspond to LB and UB of the present application if they are numerical values for indicating a wavelength range corresponding to visible light in fact.

Also, the first wavelength WL1 may be greater than the second wavelength WL2. In other words, a wavelength range equal to or greater than the second wavelength WL2 may include the first wavelength WL1.

The filter group 150 according to an embodiment of the inventive concept may include a first filter 151 that reduces light of the second wavelength WL2 or higher. In this case, the second wavelength WL2 may correspond to, for example, 650 nm. Such a first filter 151 may be used to remove infrared components from incident light.

Also, the filter group 150 according to an embodiment of the inventive concept may include second filters 152 and 153 that reduce light of the first wavelength WL1. In this case, the first wavelength WL1 is a wavelength of light emitted from the light source 130 for focus control as described above, and may correspond to, for example, 905 nm. Such second filters 152 and 153 may be used to remove components of light for focus control from incident light.

Meanwhile, in one embodiment of the inventive concept, the second filter 152 may be configured to remove wavelengths corresponding to a predetermined width W around the first wavelength WL1.

Also, in another embodiment of the inventive concept, the second filter 153 may be configured to remove wavelengths greater than or equal to the first wavelength WL1.

As such, 'removing the light of the first wavelength WL1' in the inventive concept may mean removing a range of wavelengths including light of the corresponding wavelength (e.g., as in the second filter 153) in addition to removing only the corresponding wavelength (e.g., as in the second filter 152).

The filter group 150 according to an embodiment of the inventive concept may include a third filter 154 passing light of all wavelengths. Such a third filter 154 may be used to obtain a brightest image as much as possible in an extremely low light environment.

When the brightness of the photographing area 200 is greater than or equal to a predetermined first threshold brightness, the processor 110 according to an embodiment of the inventive concept may select a first filter among the above-described filters as a filter corresponding to the brightness. In this case, the first threshold brightness may be greater than the second threshold brightness.

Also, when the brightness of the photographing area 200 is less than the first threshold brightness and greater than or equal to the second threshold brightness, the processor 110 may select the second filter as a filter corresponding to the brightness.

Also, when the brightness of the photographing area 200 is less than the second threshold brightness, the processor 110 may select a third filter as a filter corresponding to the brightness.

The processor 110 according to an embodiment of the inventive concept may adjust the focus based on light obtained from the photographing area 200 to which the light of the first wavelength WL1 is irradiated in S430.

At this time, the processor 110 according to an embodiment of the inventive concept may determine a mode for irradiating light of the first wavelength WL1 according to the type of filter (or the brightness of the photographing area 200) determined according to the above-described process.

FIG. 3 is a diagram for explaining a first mode 131 and a second mode 132 according to an embodiment of the inventive concept.

For example, when one of the first filter and the second filter is selected according to the above process (or when the brightness of the photographing area 200 is greater than or equal to the first threshold brightness, or when the brightness of the photographing area 200 is the first threshold brightness less than and greater than the second threshold brightness), the processor 110 may radiate light of the first wavelength WL1 to the photographing area 200 according to the first mode 131. In this case, the first mode 131 may be a mode in which light of the first wavelength is continuously irradiated to the photographing area 200 during the image acquisition process.

Meanwhile, when the third filter is selected according to the above process (or when the brightness of the photographing area 200 is less than the second threshold brightness), the processor 110 may radiate light of the first wavelength WL1 to the photographing area 200 according to the second mode 132. In this case, the second mode 132 may be a mode in which irradiation of light of the first wavelength WL1 to the photographing area 200 is stopped during at least a partial time period during image acquisition.

As described above, since the third filter corresponds to a filter that passes light of all wavelengths, the third filter may be a filter suitable for obtaining an image in an extremely low illumination environment. However, because light for focus control also passes due to the characteristics of the third filter, an image obtained by the image sensor 160 may be affected by light for focus control. Accordingly, the processor 110 may restrictly exclude the effect of light for focus control on an image obtained using light of the first wavelength WL1 only in the focus control step, for example.

The processor 110 according to an embodiment of the inventive concept may adjust the focus using various known methods under the above-described light source control method. For example, the processor 110 may adjust the focus using the contrast of the image, or may adjust the focus using the edge component of the image. However, this is merely an example and the spirit of the inventive concept is not limited thereto.

The processor 110 according to an embodiment of the inventive concept may obtain an image using light obtained from the photographing area 200 through a filter selected according to the above-described process in S440. For example, when the first filter is selected according to the above-described process (that is, when the brightness of the photographing area 200 is greater than or equal to a predetermined first threshold brightness or when the amount of light is sufficient), the processor 110 may continuously radiate light of the first wavelength WL1 to the photographing area 200. In this case, the processor 110 may adjust the focus using light obtained from the photographing area 200 to which light of the first wavelength WL1 is irradiated (or light incident from the photographing area 200). Also, the processor 110 may obtain an image using light obtained through the first filter. In other words, the processor 110 may obtain an image using light from which wavelengths equal to or greater than the second wavelength WL2 are removed (of course, light from which the light of the first wavelength WL1 is also removed).

On the other hand, when the second filter is selected according to the above-described process (i.e., when the brightness of the photographing area 200 is less than a predetermined first threshold brightness and greater than a predetermined second threshold brightness or when the amount of light is insufficient), the processor 110 may continuously radiate light of the first wavelength WL1 to the photographing area 200. In this case, the processor 110 may adjust the focus using light obtained from the photographing area 200 to which light of the first wavelength WL1 is irradiated (or light incident from the photographing area 200). Also, the processor 110 may obtain an image using light obtained through the second filter. In other words, the processor 110 may obtain an image using light having a reduced first wavelength WL1 (or light having a reduced wavelength equal to or greater than the first wavelength WL1).

Meanwhile, when the third filter is selected according to the above process (i.e., when the brightness of the photographing area 200 is less than the predetermined second threshold brightness or when the amount of light is extremely insufficient), the processor 110 may radiate light of the first wavelength WL1 to the photographing area 200 only during a partial time period (e.g., a focus adjustment period). In this case, the processor 110 may adjust the focus using light obtained from the photographing area 200 to which light of the first wavelength WL1 is irradiated (or light incident from the photographing area 200). Also, the processor 110 may obtain an image using light obtained through the third filter. In other words, the processor 110 may obtain an image using light including all wavelengths.

Accordingly, the inventive concept may improve focus control performance in various brightness environments.

The embodiment according to the inventive concept described above may be implemented in the form of a computer program that may be executed through various components on a computer, and such a computer program may be recorded in a computer-readable medium. In this case, the medium may include magnetic media, such as hard disks, floppy disks, and magnetic tapes, optical recording media, such as CD-ROM and DVD, magneto-optical medium, such as a floptical disk, and a hardware device specially configured to store and execute program instructions, such as ROM, RAM, flash memory, and the like. Further, the medium may include an intangible medium implemented in a form that may be transmitted on a network, and may be a medium that is implemented in the form of software or an application, for example, and may be transmitted and distributed through a network.

Meanwhile, the computer program may be specially designed and configured for the inventive concept, or may be known and usable to those skilled in the computer software field. Examples of the computer program may include not only machine language codes, such as those produced by a compiler, but also high-level language codes that may be executed by a computer using an interpreter or the like.

The specific implementations described in the inventive concept are examples, and do not limit the scope of the inventive concept in any way. For brevity of the specification, descriptions of conventional electronic configurations, control systems, software, and other functional aspects of the systems may be omitted. In addition, the connection or connection members of lines between the components shown in the drawings are illustrative of functional connections and/or physical or circuit connections, and may be represented as a variety of functional connections, physical connections, or circuit connections that are replaceable or additional in an actual device. In addition, if there is no specific mention, such as "essential" or "importantly", it may not be an essential component for the application of the inventive concept.

Therefore, the spirit of the inventive concept is limited to the above-described embodiments and should not be determined, and it will be said that not only the claims to be described later, but also all ranges equivalent to or equivalently changed from the claims are within the scope of the spirit of the inventive concept.

The invention claimed is:

1. An image obtaining method employed by an image obtaining apparatus, the image obtaining method comprising:

selecting a filter corresponding to a brightness of a photographing area from among a plurality of filters of the image obtaining apparatus, wherein the plurality of filters includes:

a first filter configured to reduce light of a first wavelength and light of a second wavelength, wherein the first wavelength is greater than the second wavelength; and a second filter configured to reduce the light of the first wavelength and pass the second wavelength; and a third filter configured to pass the first wavelength and the second wavelength;

adjusting focus based on light obtained from the photographing area to which the light of the first wavelength is irradiated; and obtaining an image using light obtained from the photographing area through the filter, corresponding to the brightness, that is selected, wherein the selecting of the filter comprises selecting one from among the first filter, the second filter, and the third filter based on comparing the brightness of the photographing area with at least two brightness thresholds.

2. The image obtaining method of claim 1, further comprising, before the selecting of the filter, checking the brightness of the photographing area based on at least one of an image obtained by an image sensor and a brightness monitored by a brightness sensor.

3. A computer program stored on a recording medium, the computer program configured to, when executed by at least one processor, cause the at least one processor to execute the image obtaining method of claim 2.

4. The image obtaining method of claim 1, wherein the selecting of the filter comprises:

selecting the first filter as the filter corresponding to the brightness based on determining that the brightness of the photographing area is greater than or equal to a first threshold brightness;

selecting the second filter as the filter corresponding to the brightness based on determining that the brightness of the photographing area is less than the first threshold brightness and greater than or equal to a second threshold brightness; or selecting the third filter as the filter corresponding to the brightness based on determining that the brightness of the photographing area is less than the second threshold brightness.

5. The image obtaining method of claim 4, wherein the adjusting of the focus comprises:

radiating light of the first wavelength to the photographing area according to a first mode in a case where one from among the first filter and the second filter is selected as the filter corresponding to the brightness in the selecting of the filter; and irradiating the light of the first wavelength to the photographing area according to a second mode in a case where the third filter is selected as the filter corresponding to the brightness in the selecting of the filter.

6. A computer program stored on a recording medium, the computer program configured to, when executed by at least one processor, cause the at least one processor to execute the image obtaining method of claim 5.

7. The image obtaining method of claim 5, wherein the first mode is a mode in which the light of the first wavelength is continuously irradiated to the photographing area, wherein the second mode is a mode in which irradiation of light of the first wavelength is stopped to the photographing area in at least a partial time period.

8. The image obtaining method of claim 7, wherein the second mode is a mode that irradiates the light of the first wavelength only in a time period in which the image obtaining apparatus adjusts the focus for the photographing area and stops the irradiation of the light of the first wavelength in a time period in which an image of the photographing area is acquired using an image sensor.

9. A computer program stored on a recording medium, the computer program configured to, when executed by at least one processor, cause the at least one processor to execute the image obtaining method of claim 8.

10. A computer program stored on a recording medium the computer program configured to, when executed by at least one processor, cause the at least one processor to execute the image obtaining method of claim 7.

11. A computer program stored on a recording medium, the computer program configured to, when executed by at least one processor, cause the at least one processor to execute the image obtaining method of claim 4.

12. The image obtaining method of claim 4, wherein the selecting of the filter comprises selecting the first filter as the filter corresponding to the brightness based on determining that the brightness of the photographing area is greater than or equal to the first threshold brightness.

13. The image obtaining method of claim 4, wherein the selecting of the filter comprises selecting the second filter as the filter corresponding to the brightness based on determining that the brightness of the photographing area is less than the first threshold brightness and greater than or equal to the second threshold brightness.

14. The image obtaining method of claim 4, wherein the selecting of the filter comprises selecting the third filter as the filter corresponding to the brightness based on determining that the brightness of the photographing area is less than the second threshold brightness.

15. A computer program stored on a recording medium, the computer program configured to, when executed by at least one processor, cause the at least one processor to execute the image obtaining method of claim 1.

16. An image obtaining apparatus comprising:

a light source configured to radiate light of a first wavelength to a photographing area;

an image sensor configured to convert light incident from the photographing area into an electrical signal;

a filter group comprising a plurality of filters configured to be disposed between the incident light and the image sensor, the plurality of filters comprising:

a first filter configured to reduce light of the first wavelength and light of a second wavelength, wherein the first wavelength is greater than the second wavelength; and a second filter configured to reduce the light of the first wavelength and pass the second wavelength; and a third filter configured to pass the first wavelength and the second wavelength; and at least one processor configured to select one from among the plurality of filters included in the filter group as a filter according to a brightness of the photographing area, adjust a focus based on light obtained by irradiation of light of the first wavelength onto the photographing area, and obtain an image using light obtained through the selected filter, wherein the at least one processor is configured to select one from among the first filter, the second filter, and the third filter based on comparing the brightness of the photographing area with at least two brightness thresholds.

17. The image obtaining apparatus of claim 16, further comprising a brightness sensor configured to detect brightness of the photographing area, wherein the at least one processor is further configured to check the brightness of the photographing area based on at least one from among an image obtained by the image sensor and a brightness monitored by the brightness sensor.

18. The image obtaining apparatus of claim 16, wherein the at least one processor is further configured to:

select the first filter as the filter corresponding to the brightness based on determining that the brightness of the photographing area is greater than or equal to a first threshold brightness, select the second filter as the filter corresponding to the brightness based on determining that the brightness of the photographing area is less than the first threshold brightness and greater than or equal to a second threshold brightness, and select the third filter as the filter corresponding to the brightness based on determining that the brightness of the photographing area is less than the second threshold brightness.

19. The image obtaining apparatus of claim 18, wherein the at least one processor is further configured to:

control the light source to radiate light of the first wavelength to the photographing area according to a first mode in a case where one of the first filter and the second filter is selected as the filter corresponding to the brightness, and control the light source to radiate light of the first wavelength to the photographing area according to a second mode in a case where the third filter is selected as the filter corresponding to the brightness in the selecting of the filter.

20. The image obtaining apparatus of claim 19, wherein the first mode is a mode in which light of the first wavelength is continuously irradiated to the photographing area, wherein the second mode is a mode in which irradiation of light of the first wavelength is stopped to the photographing area in at least a partial time period.

21. The image obtaining apparatus of claim 20, wherein the second mode is a mode wherein the light of the first wavelength is irradiated only in a time period in which the image obtaining apparatus adjusts the focus for the photographing area and the irradiation of the light of the first wavelength is stopped in a time period in which an image of the photographing area is acquired using an image sensor.

* * * * *